Figure 1:
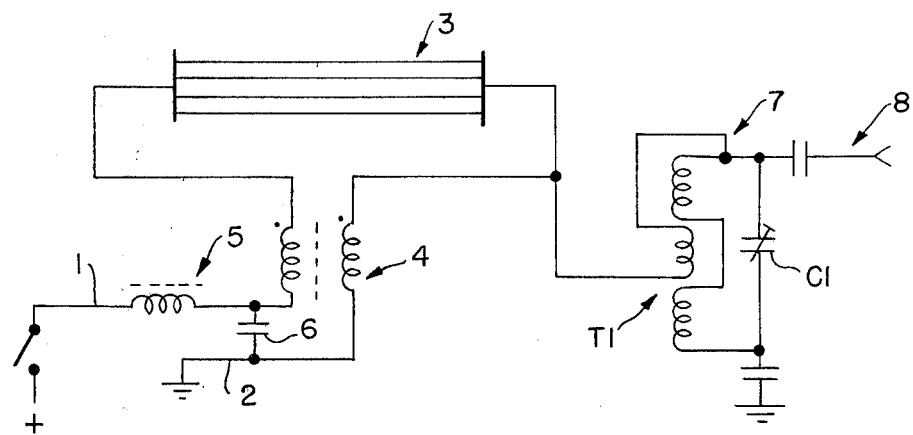

United States Patent [19]

Kropielnicki

[11] 4,422,077
[45] Dec. 20, 1983

[54] ELECTRICAL SIGNAL SEPARATING DEVICE FOR COMBINED WINDSHIELD ANTENNA AND HEATER GRID

[75] Inventor: Jerzy J. Kropielnicki, Knutsford, England

[73] Assignee: B.S.H. Electronics (Manchester) Limited, Manchester, England

[21] Appl. No.: 359,304

[22] Filed: Mar. 18, 1982

Related U.S. Application Data

[63] Continuation of Ser. No. 105,232, Dec. 19, 1979, abandoned, which is a continuation of Ser. No. 933,289, Aug. 14, 1978, abandoned.

[30] Foreign Application Priority Data

Aug. 17, 1977 [GB] United Kingdom ............... 34443/77

[51] Int. Cl.³ .......................... H01Q 1/02; H01Q 1/32
[52] U.S. Cl. ..................... 343/704; 343/713
[58] Field of Search ................................ 343/704, 713

[56] References Cited

U.S. PATENT DOCUMENTS 4,003,056  1/1977  Davis .................................. 343/704
4,086,594  4/1978  Kropielnicki et al. .............. 343/704

FOREIGN PATENT DOCUMENTS 647665  12/1950  United Kingdom ............... 343/705

Primary Examiner—Eli Lieberman
Attorney, Agent, or Firm—Shoemaker and Mattare, Ltd.

[57] ABSTRACT

An electrically heated window, for example, a motor vehicle heated rear window, is provided with a signal separating device to enable the heating element of the window to be used simultaneously as a transmitting aerial and for heating purposes.

7 Claims, 6 Drawing Figures

ELECTRICAL SIGNAL SEPARATING DEVICE FOR COMBINED WINDSHIELD ANTENNA AND HEATER GRID

This is a continuation, of application Ser. No. 105,232, filed Dec. 19, 1979, which is a continuation of Ser. No. 933,289, filed Aug. 14, 1978, both now abandoned.

This invention relates to an electrical signal separating device for separating a radio signal from the heating element of an electrically heated window whereby for example a heated rear window of a motor vehicle can be used simultaneously for heating purposes and as a radio aerial, such motor vehicle electrically heated window not designed specifically to be an antenna or aerial, and, therefore, essentially aperiodic and non-resonant at specific or VHF frequencies of use.

In the specification of our earlier British Patent No. 1,520,030 there is specifically described an electrical signal separating device of the above mentioned kind for use with a motor car heated rear window to enable same to be used as a receiving aerial for a car radio. Such electrical signal separating device is also described in applicant's issued U.S. Pat. No. 4,086,594, which is incorporated herein by reference.

In accordance with the present invention, which is an improvement in or modification of the invention of said earlier Patent, it is now proposed to use an electrical signal separating device of the above mentioned kind with an electrically heated window such as to enable said window to be used as a transmitting aerial.

With this arrangement, in the case where the heated window is a motor vehicle heated window, said window can be used as the aerial for a portable or mobile transmitter carried by or used within or in the vicinity of the motor vehicle.

The transmitter may be a short range communications transmitter such as a "Citizens Band" transmitter, or a transmitter used by police or other emergency services, or a transmitter used by taxi, security or transport organisations, or a radio-telephone transmitter, or a transmitter used in any other suitable context.

Alternatively, or additionally, the transmitter may be a long range transmitter, for example, a mobile amateur radio communications transmitter.

The transmitter may be used in conjunction with a receiver in a two-way communications system in which case the said window may act as the receiving aerial as well as the transmitting aerial. it is however possible to use a separate receiving aerial, if desired. Also, if desired, the transmitter may be used alone, without a receiver, for example, for one-way communications.

Whilst it is visualised that the invention will find particular application in the context of communications it is to be understood that the invention is not restricted to this field and may instead apply to the transmissions of warning signals, control signals, information or the like.

With regard to the construction of the signal separating device, this may be of similar form to the device described in the aforementioned Patent particularly with regard to the provision of a bifilar coil which offers negligible resistance to heavy direct currents but efficiently rejects RF signals even in the case where RF signals are fed to the coil simultaneously with passage of heavy direct currents therethrough.

The bifilar coil may be air-cored or may be provided with a ferrite core or a metal core. For short wave transmissions a ferrite core is preferred.

Alternatively, separating arrangements other than such bifilar coil may be used preferably involving air-gapped coils.

An appropriate matching network may be incorporated in said signal separating device for matching the aerial to the transmitter.

In one embodiment of the invention the signal separating device may be controlled so as to be suitable for use both as a transmitting aerial at an appropriate communications wavelength, and also as a receiving aerial for receiving transmissions at usual AM and/or FM wavelengths. In this way, for example, a car heated rear window can be used both as a receiving aerial for a car radio and also as a transmitting/receiving aerial for a communications transmitter/receiver used in the car. In this context, the circuit of the signal separating device may incorporate two bifilar coils or other separating arrangements appropriate to the two operating wavelength ranges, and also appropriate protective circuitry and the like.

The invention will now be described further by way of example only and with reference to the accompanying drawings in which:

FIGS. 1 to 6 which are circuit diagrams of different signal separating devices according to the invention.

With the embodiment of FIG. 1, two supply leads 1, 2 for a motor car heated rear window 3 have interposed therein the two windings of a ferrite-cored bifilar coil 4 and also a choke 5. A capacitor 6 is connected between the leads 1, 2 after the choke 5 and before the bifilar coil 4.

One the leads 2 is connected, after the bifilar coil 4 and before the heating element of the window 3, to an aerial matching circuit 7 which in use is connected at a terminal 8 thereof to the aerial connection of a transmitter/receiver and, as clearly depicted in FIG. 1, the leads connecting the bifilar coil 4 with the heating element of the window 3 act as power output leads for the motor vehicle D.C. power supply.

In use, the heated rear window 3 acts as an aerial for the transmitter/receiver, even in the case where the heated rear window is operatively connected to a d.c. supply and a heavy direct current is flowing through the heating element. In this respect, the bifilar coil 4 allows passage of the direct current but acts efficiently to isolate radio signals from the supply circuit. A more detailed discussion of the operation of the bifilar coil is given in the aforesaid British Patent No. 1,520,030.

With the circuit arrangement of FIG. 1 it will be apparent that the aerial 3 acts as a capacitive impedance of r.f. signals. The matching circuit 7, as can be seen, incorporates a transformer T1 and a variable capacitor $C_1$. The variable capacitor is used to tune the circuitry so that the capacitive impedance appears as a resistive impedance which is matched to the transmitter aerial feeder circuitry connected to the terminal 8 by the transformer T1.

With the arrangement described above, a heated rear window can be used as an efficient transmitting/receiving aerial whereby problems involved in the use of an external car aerial of the whip kind can be avoided. Further, the signal separating device used to convert the window for use as an aerial is of simple and inexpensive construction and also can be of a small sized, compact nature.

Figure 2:
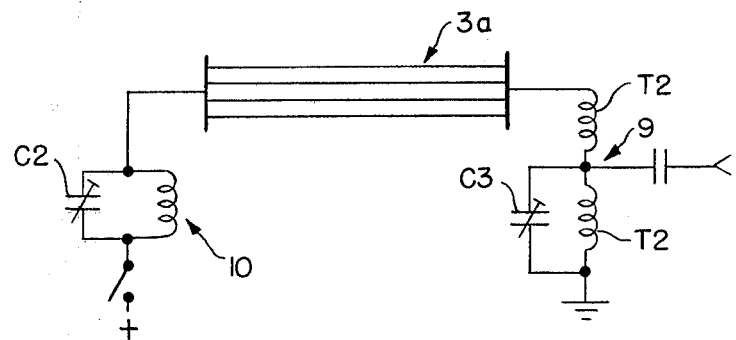

With the arrangement of FIG. 2, an aerial matching circuit 9, similar to the arrangement 7 of FIG. 1, is provided, but instead of the bifilar coil 4, the power supply is connected to the heated rear window 3a via a parallel inductance/capacitance tuned circuit 10 in one lead and via the circuit 9 in the other lead.

The circuits 9, 10 are tuned (by means of the variable capacitors $C_2$, $C_3$) to present a high impedance to r.f. signals. The r.f. signals are thereby isolated from the supply circuit. The capacitive impedance of the aerial 3a is matched to the resistive impedance of the transmitter aerial feeder circuitry by means of the transformer T2 and the variable capacitor $C_3$ of the circuit 9.

Figure 3:
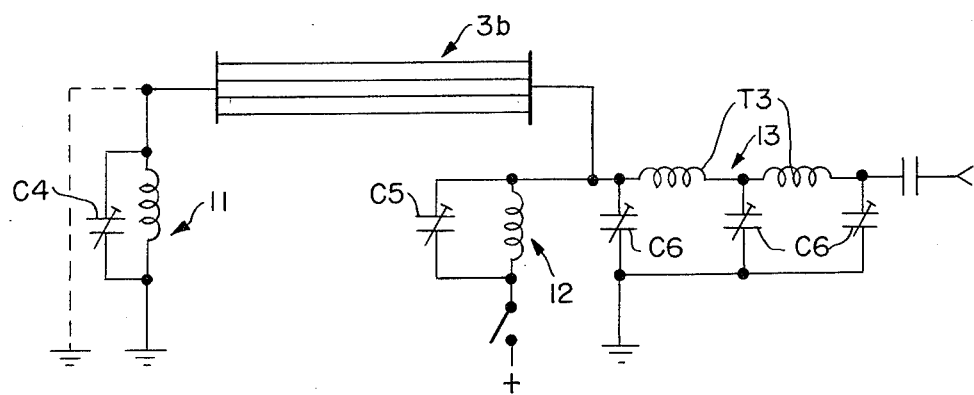

With the arrangement of FIG. 3, the power supply is connected to the heated rear window via two parallel tuned circuits 11, 12 although alternatively if desired, and as shown in dotted lines, one side of the window may be connected direct to earth so that RF signals as well as the d.c. circuit are earthed at such side of the window. The other side of the window is connected to the aerial connection via an impedance matching circuit 13 which comprises one or a plurality of coils (two are shown by way of example in the drawing) with intermediate adjustable capacitors.

The circuits 11, 12 are tuned (by means of the variable capacitors $C_4$, $C_5$) to present a high impedance to r.f. signals. The r.f. signals are thereby isolated from the supply circuit. The capacitive impedance of the aerial 3b is matched to the resistive impedance of the transmitter aerial feeder circuitry by means of the transformer T3 and the variable capacitors $C_6$ of the circuit 13.

Figure 4:
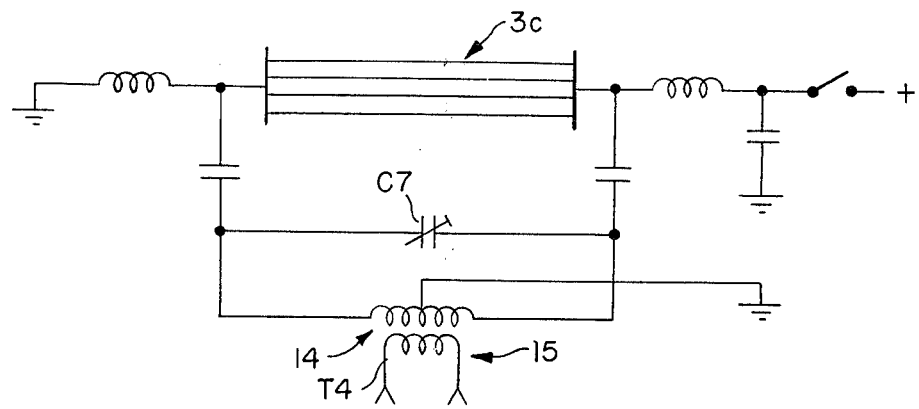

With the arrangement of FIG. 4, the heated rear window 3c forms with an inductance 14 a closed loop of push-pull configuration, and opposite sides of the window are connected to the power supply via RF chokes, or alternatively via parallel inductance/capacitance circuits.

The aerial connection is made via an inductive link 15 giving balanced outputs.

The aerial 3C is driven by r.f. signals fed to opposite ends thereof from the transmitter aerial feeder circuitry. The aerial 3c acts as an inductive impedance and is tuned to act as a resistive impedance, by means of the variable capacitor $C_7$, and is matched to the aerial feeder circuitry impedance by means of the transformer T4.

Figure 5:
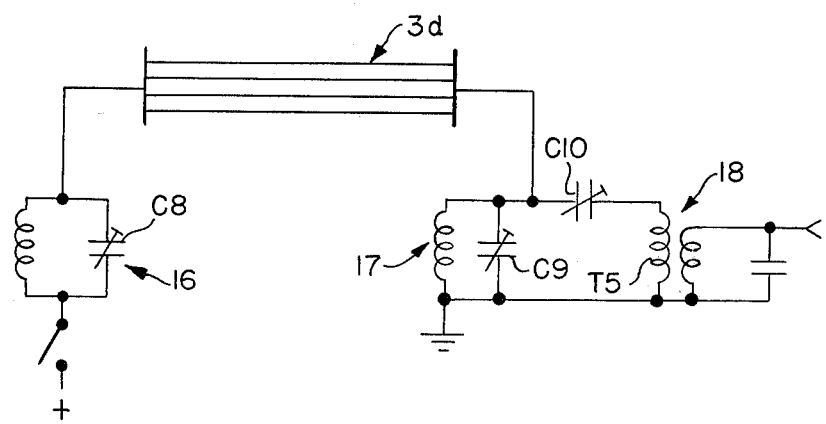

The arrangement of FIG. 5 is a modification of the arrangement of FIG. 2. Each power supply lead for the window 3d incorporates a respective parallel tuned circuit 16, 17 although if desired these may be replaced by a bifilar coil arrangement. The aerial matching circuit 18 may have air-gapped or cored coils in accordance with requirements.

Figure 6:
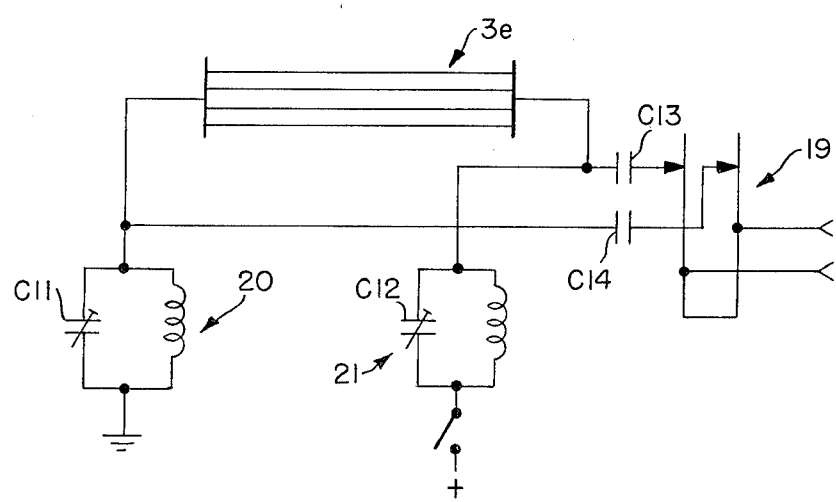

R.f. signals are isolated from the supply circuit by means of the two circuits 16, 17 which are tuned with the variable capacitors $C_8$, $C_9$. The capacitive impedance of the aerial 3d is matched to the resistive impedance of the transmitter aerial feeder circuitry by means of the transformer T5 and the variable capacitor $C_{10}$ of the circuit 18, the capacitor $C_{10}$ in this case being in series with the aerial. The arrangement of FIG. 6 is particularly suitable for VHF/UHF use and utilises a matching stub 19 having predetermined tapping points for matching the aerial impedance of the window 3e. The power supply is connected to the window 3e via parallel tuned circuits 20, 21.

R.f. signals are isolated from the supply circuit by means of the two circuits 20, 21 which are tuned with the variable capacitors $C_{11}$, $C_{12}$. The aerial 3e is driven by r.f. signals fed to opposite ends thereof from the transmitter aerial feeder circuitry. The aerial 3e acts as an inductive impedance and is tuned to act as a resistive impedance, by the series capacitor $C_{13}$, $C_{14}$, and is matched to the aerial feeder circuitry impedance by means of the stub.

It is of course to be understood that the invention is not intended to be restricted to the details of the above embodiments which are described by way of example only.

What is claimed is:

1. An isolating and matching device to enable a motor vehicle electrically heated window, not designed specifically to be an antenna or aerial and essentially aperiodic and non-resonant at VHF frequencies, to be used as a transmitting aerial, comprising: an electrical circuit having input leads for connection to a motor vehicle D.C. power supply, power output leads for connection to a window heating element of said motor vehicle electrically heated window, and an aerial input terminal for connection of said electrical circuit to an aerial feeder circuit of a transmitter, the said electrical circuit further including isolating circuitry interconnecting said input leads and said power output leads, and matching and tuning circuitry interconnecting the said power output leads and said aerial input terminal, said isolating circuitry including a bifilar coil formed by two wires wound on a common core and defining two concentric coils and being operative to permit passage of current from said motor vehicle D.C. power supply to heat said window while isolating or blocking passage of radio signals from said window heating element to said motor vehicle D.C. power supply, and said matching and tuning circuitry being operative to effectively match the impedance of the entire said window heating element to said aerial feeder circuit of a transmitter so that efficient VHF transmission, from said motor vehicle electrically heated window of signals received at said aerial input terminal, is effected.

2. A device according to claim 1 wherein said matching and tuning circuitry comprises an arrangement of one or more coils.

3. A device according to claim 1 wherein said matching and tuning circuitry comprises at least one tuning capacitor.

4. A device according to claim 2 wherein the said matching and tuning circuit comprises at least one parallel inductance/capacitance tuned circuit.

5. A device according to claim 1 wherein said motor vehicle electrically heated window is suitable for use both as said transmitter aerial and as a receiving aerial for efficient transmission and reception of VHF communications when said transmitter device comprises a two-way communications transmitter/receiver.

6. An improvement of an electrical signal separating device for separating a radio signal from the heating element of a motor vehicle electrically heated window and comprising an electrical circuit having input leads for connection to a motor vehicle D.C. power supply, power output leads for connection to the heating element, and a radio signal output terminal for connection to the aerial circuit of a radio receiver for feeding radio signals picked up by the heating element to the receiver, said circuit further including a blocking circuit for blocking passage of said radio signals to the power supply, wherein the blocking circuit comprises a bifilar coil formed by two wires wound on a common core and defining two concentric coils, the coils being interposed respectively between the said input leads and power output leads and being mutually coupled and arranged so as to provide high impedance paths for in-phase fluctuating currents at said power output leads but low resistance paths for currents flowing through said circuit from the D.C. power supply, said heating element acting as a conductive sheet to radio signals, whereby the bifilar coil effectively blocks the radio frequency signals while passing the current from the D.C. power supply to the heating element; said improvement comprising:

the incorporation of matching and tuning circuitry interconnecting said power output leads and an aerial input terminal of an aerial feeder circuit of a transmitter used in place of said radio receiver and its aerial circuit, said signal separating device being operative to permit passage of current from said motor vehicle D.C. power supply to heat said window while isolating or blocking passage of radio signals from said heating element to said motor vehicle D.C. power supply, and said matching and tuning circuitry being operative to effectively match the impedance of the entire said window heating element to said aerial feeder circuit of said transmitter to thereby enable said window to be used as a transmitting aerial such that efficient VHF transmission, from said motor vehicle electrically heated window of signals received at the said aerial input terminal, is effected.

7. The improvement defined in claim 6, wherein said transmitter comprises a two-way communications transmitter/receiver device and wherein said motor vehicle electrically heated window is suitable for use both as a transmitting aerial and as a receiving aerial for efficient transmission and reception of VHF communications.

* * * * *